US 11,009,982 B2

(12) United States Patent
Fan (10) Patent No.: US 11,009,982 B2
(45) Date of Patent: May 18, 2021

(54) CIRCUIT BOARD, DISPLAY CONTROL DEVICE AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventor: Wenjin Fan, Beijing (CN)

(73) Assignees: Hefei Xinsheng Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/393,054

(22) Filed: Apr. 24, 2019

(65) Prior Publication Data

US 2020/0103998 A1 Apr. 2, 2020

(30) Foreign Application Priority Data

Sep. 27, 2018 (CN) .......................... 201811133559.6

(51) Int. Cl.
*G06F 3/044* (2006.01)
*G06F 3/041* (2006.01)

(52) U.S. Cl.
CPC ............ *G06F 3/0412* (2013.01); *G06F 3/044* (2013.01); *G06F 2203/04103* (2013.01)

(58) Field of Classification Search
CPC .... G06F 3/0412; G06F 3/044; G06F 3/04164; G06F 2203/04103
See application file for complete search history.

(56) References Cited

U.S. PATENT DOCUMENTS

| 2014/0300577 A1* | 10/2014 | Hotelling | G06F 3/0416 |
| | | | 345/174 |
| 2015/0261348 A1* | 9/2015 | Jang | G06F 3/04166 |
| | | | 345/174 |
| 2018/0143712 A1 | 5/2018 | Lee et al. | |

FOREIGN PATENT DOCUMENTS

| CN | 102169401 A | 8/2011 |
| CN | 103092383 A | 5/2013 |
| CN | 106933369 A | 7/2017 |

OTHER PUBLICATIONS

First Office Action for CN Patent Application No. 201811133559.6 dated Mar. 2, 2021.

* cited by examiner

*Primary Examiner* — Robert J Michaud
(74) *Attorney, Agent, or Firm* — Thomas | Horstemeyer LLP (57) ABSTRACT

The present disclosure discloses a circuit board, a display control device and a display device. The circuit board includes at least two circuit modules. Each of the circuit modules includes a plurality of first-type signal receiving terminals. Respective numbers of the first-type signal receiving terminals included in the at least two circuit modules are the same. Respective number of channels used by the at least two circuit modules to transmit a first-type signal are different. The display control device includes the above circuit board. The circuit board, the display control device and the display device provided by the present disclosure are used in touch display.

20 Claims, 4 Drawing Sheets

FIG. 5

CIRCUIT BOARD, DISPLAY CONTROL DEVICE AND DISPLAY DEVICE

CROSS-REFERENCE

This application is based upon and claims priority to Chinese Patent Application No. 201811133559.6, filed on Sep. 27, 2018, the entire contents thereof are incorporated herein by reference.

TECHNICAL FIELD

The present disclosure relates to the technical field of touch control, and in particular, to a circuit board, a display control device and a display device.

BACKGROUND

With the development of display technology, more and more display devices are equipped with capacitive touch screens, such that the display device can have the function of human-computer interaction.

The main difference between different capacitive touch screens lies in the touch resolution of the capacitive sensing device. The masks used in the production of capacitive touch screens with different touch resolutions are different, resulting in higher production costs for producing capacitive touch screens.

SUMMARY

The present disclosure provides a circuit board. The circuit board includes at least two circuit modules. Each of the circuit modules includes a plurality of first-type signal receiving terminals. Respective numbers of the first-type signal receiving terminals included in the circuit modules are the same. Respective numbers of channels used by the circuit modules to transmit a first-type signal are different.

In some arrangements, each of the circuit modules further includes s first-type signal nodes and s first-type signal transmitting terminals connected in a one-to-one correspondence with the s first-type signal nodes. Each of the first-type signal nodes included in each of the circuit modules is connected to at least one first-type signal receiving terminal, and respective number of the first-type signal nodes included in the circuit modules are different.

In some arrangements, respective numbers of the first-type signal receiving terminals connected to at least two first-type signal nodes in the circuit modules are either the same or different.

In some arrangements, each of the circuit modules further includes a plurality of second-type signal receiving terminals. Respective numbers of the second-type signal receiving terminals included in the circuit modules are the same. Respective numbers of channels used by the circuit modules to transmit a second-type signal are different.

In some arrangements, each of the circuit modules further includes t second-type signal nodes and t second-type signal transmitting terminals connected in one-to-one correspondence with the t second-type signal nodes. Each of the second-type signal nodes included in each of the circuit modules is connected to at least one second-type signal receiving terminal. Respective numbers of the second-type signal nodes included in the circuit modules are different Further, respective numbers of the second-type signal receiving terminals connected to at least two second-type signal nodes in the circuit modules are either the same or different.

In some arrangements, each of the first-type signal receiving terminals is a touch signal receiving terminal, and each of the second-type signal receiving terminals is a sensing signal receiving terminal.

In some arrangements, the circuit board further includes at least two channel switch modules in one-to-one correspondence with the at least two circuit modules, and each of the channel switch modules is configured to turn on and off the corresponding circuit module.

The present disclosure further provides a display control device including a data processor and the circuit board according to any one of the above technical solution. The data processor is connected to at least two circuit modules.

In some arrangements, the data processor includes at least two touch drivers in a one-to-one correspondence with the at least two circuit modules. Respective numbers of channels of the touch drivers are different.

In some arrangements, when each of the circuit modules includes s first-type signal transmitting terminals and t second-type signal transmitting terminals, each touch driver includes s first-type signal interfaces and t second-type signal interfaces, the s first-type signal transmitting terminals included in each of the circuit modules are connected to the s first-type signal interfaces included in each of the touch drivers in a one-to-one correspondence. The t second-type signal transmitting terminals included in each of the circuit modules are connected to the t second-type signal interfaces included in each of the touch drivers in a one-to-one correspondence.

In some arrangements, when the circuit board further includes at least two channel switch modules, the display control device further includes a channel control module. The channel control module is connected to control terminals of the at least two channel switch modules.

The present disclosure further provides a display device. The display device includes a touch panel and the display control device according to any one of the above technical solution. The touch panel includes a plurality of first-type signal terminals. Each of the plurality of first-type signal receiving terminals included in each of the circuit modules is configured to be connected to the plurality of first-type signal terminals in a one-to-one correspondence.

In some arrangements, when each of the circuit modules includes a plurality of second-type signal receiving terminals, the touch panel further includes a plurality of second-type signal terminals, each of the plurality of second-type signal receiving terminals included in each of the circuit modules is configured to be connected to the plurality of second-type signal terminals in a one-to-one correspondence.

BRIEF DESCRIPTION OF THE DRAWINGS

The drawings described herein are intended to provide a further understanding of the present disclosure, and are intended to constitute a part of the present disclosure. The illustrative arrangements of the present disclosure and the description thereof are for explaining the present disclosure and do not constitute an undue limitation of the present disclosure. In the drawing.

DETAILED DESCRIPTION

The technical solutions in the arrangements of the present disclosure are clearly and completely described in the following with reference to the accompanying drawings in the arrangements of the present disclosure. Apparently, the described arrangements are only a part of the arrangements of the present disclosure, but not all of the arrangements. All other arrangements obtained by those skilled in the art based on the arrangements of the present disclosure without creative efforts are within the scope of the present disclosure.

The existing capacitive touch screens can be classified into a thin film type touch screen, an external touch screen, a single layer touch screen, and the like. However, the existing capacitive touch screen includes a plurality of sensing electrodes and a plurality of touch electrodes. The plurality of sensing electrodes are used as transmitting channels for transmitting sensing signals, and the plurality of touch electrodes are used as receiving channels for receiving touch signals. The plurality of sensing electrodes and the plurality of touch electrodes are formed in a one-to-one correspondence to form a plurality of mutual capacitances. For convenience of description, one mutual capacitance formed by one sensing electrode and one touch electrode is defined as a capacitive sensing device.

When a finger touches one of the touch electrodes, the mutual capacitance formed by the touch electrode and the corresponding sensing electrode changes, such that the touch signal transmitted by the touch electrode and the sensing signal transmitted by the sensing electrode are changed, and then the touch position can be obtained through the touch driver according to the touch signal and the sensing signal. At present, capacitive sensing devices of a high-end brand capacitive touch screen occupies an area of 4 mm×4 mm, which makes the touch resolution of the high-end brand capacitive touch screen relatively high. While capacitive sensing devices of a low-end brand capacitive touch screen occupies an area of 8 mm×8 mm or more, which makes the touch resolution of the low-end brand capacitive touch screen relatively low. Different masks used in the production of capacitive touch screens of different grades result in higher production costs for producing capacitive touch screens.

Figure 1:
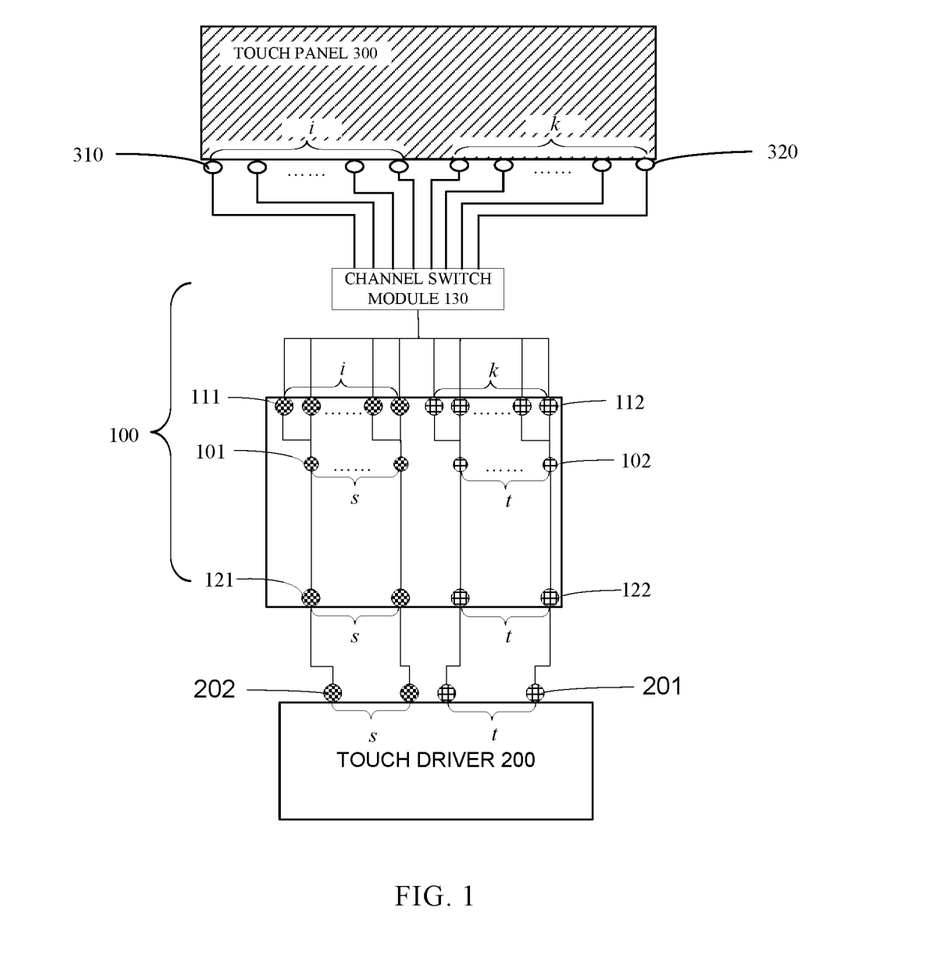
FIG. 1 is a schematic diagram of a connection between a touch driver, a circuit module, and a touch panel according to an arrangement of the present disclosure.

For the above problem, as shown in FIG. 1, an arrangement of the present disclosure provides a circuit board, which may be a flexible circuit board or a hard circuit board, depending on actual application scenarios. The circuit board includes at least two circuit modules 100. Each circuit module 100 includes a plurality of first-type signal receiving terminals 111. The respective numbers of the first-type signal receiving terminals 111 included in the circuit modules 100 are the same, and the respective numbers of channels used by the circuit module 100 to transmit the first-type signal are different.

For example, there are three circuit modules, each of which has n channels for transmitting the first-type signal, then $n_1 \neq n_2 \neq n_3$ (the subscript of n represents the serial number of the circuit module).

The assembly process of the circuit board and the touch panel provided by the arrangement of the present disclosure will be described in detail below with reference to the accompanying drawings. As shown in FIG. 1, the touch panel 300 at least includes a plurality of first-type signal terminals 310, and the first-type signal terminals 310 are in one-to-one correspondence with the first-type signal receiving terminals 111 of each circuit module 100.

When the touch display device is assembled, the required number of channels for receiving the first-type signal may be obtained according to the touch resolution requirement of the touch panel 300. Then based on this, a matched circuit module 100 is selected from the circuit board, and the plurality of first-type signal terminals 310 are connected in one-to-one correspondence with the plurality of first-type signal receiving terminals 111 of the circuit module 100.

It can be seen from the structure and the specific assembly process of the circuit board that, in the circuit board provided by the arrangement of the present disclosure, each circuit module includes the same number of first-type signal receiving terminals 111, such that the plurality of first-type signal receiving terminals 111 of each circuit module 100 can be connected to the plurality of first-type signal terminals 310 of the same touch panel in one-to-one correspondence. Since the number of channels used by each circuit module 100 for transmitting the first-type signal is different, when the touch screen is assembled with the touch panel and the circuit board, it is only necessary to determine the number of the first-type signal channels that meet the touch precision requirements according to the requirements of the touch resolution, and then a suitable circuit module 100 can be selected from the circuit board according to the number of the first-type signal channels, to be connected to the touch panel, to obtain a touch screen that meets the touch resolution requirements. Therefore, when the circuit board provided by the arrangement of the present disclosure is assembled with a touch panel, the touch panel can have different touch resolutions according to actual needs. In this way, it can reduce the production cost of the touch screen.

Moreover, the manufacturing cycle and cost of the existing yellow light touch panel are relatively high, but the manufacturing cycle of the circuit board is short and the cost is relatively low. Therefore, although the circuit board according to the arrangement of the present disclosure additionally providing the circuit module 100, it can still save time and cost.

In some arrangements, as shown in FIG. 1, each circuit module 100 further includes s first-type signal nodes 101 and s first-type signal transmitting terminals connected in one-to-one correspondence with the s first-type signal nodes 101. Each of the first-type signal nodes 101 included in each circuit module 100 is connected to at least one first-type signal receiving terminal 111, and the number of the first-type signal nodes 101 included in each circuit module 100 is different.

At this time, in one circuit module 100, each of the first-type signal nodes 101 is connected to at least one first-type signal receiving terminal 111, which means that the number of the first-type signal nodes 101 included in each circuit module 100 is less than or equal to the number of the first-type signal receiving terminals 111. For example, when each circuit module 100 includes i first-type signal receiving terminals 111, i and s are integers greater than or equal to 1, and i≥s.

When the circuit board is applied to the touch panel, each of the first-type signal nodes 101 of one circuit module 100 is connected to at least two first-type signal receiving terminals 111, and at least two first-type signal nodes 101 are connected to at least two first-type signal transmitting terminals 121 in one-to-one correspondence. It can be seen that although each circuit module can receive the same number of first-type signals, the number of the first-type signals transmitted is determined by the number of the first-type signal nodes and the number of the first-type signal transmission terminals. Moreover, in one circuit module 100, when each of the first-type signal nodes 101 is connected to at least two first-type signal receiving terminals 111, and at least two first-type signal nodes 101 are connected to at least two first-type signal transmitting terminals 121 in one-to-one correspondence, at least two channels for transferring the first-type signal may be merged to at least one channel for transferring the first-type signal through one first-type signal node 101. Therefore, when the number of the first-type signal nodes 101 included in each circuit modules 100 is different, the number of the first-type signal receiving terminals 111 included in each circuit module 100 is the same, but the number of the first-type signals transmitted is not the same.

It can be understood that, as shown in FIG. 1, the number of the first-type signal receiving terminals 111 connected to at least two first-type signal nodes 101 in each circuit modules 100 is the same or different.

For example, when one circuit module 100 includes 3 first-type signal nodes 101, 2 or 3 of which are connected to the same number of first-type signal receiving terminals 111.

For another example, when one circuit module 100 includes 3 first-type signal nodes 101, 2 or 3 of which are connected to different numbers of first-type signal receiving terminals 111.

In some arrangements, as shown in FIG. 1, each circuit module 100 further includes a plurality of second-type signal receiving terminals 112. Each circuit module 100 includes the same number of second-type signal receiving terminals 112. The number of channels used by each circuit module 100 to transmit the second-type signal may be the same or different.

When the number of channels used by each circuit module 100 for transferring the second-type signal is the same, for such circuit modules, the channels for transferring the second-type signal are not merged. When the number of channels used by each circuit module 100 for transferring the second-type signal is different, for these circuit modules, the channels for transferring the second-type signal are merged. The reason for this may be refer to the foregoing description of the channels for transferring the first-type signals.

Specifically, as shown in FIG. 1, each circuit module 100 further includes t second-type signal nodes 102 and t second-type signal transmitting terminals 122 connected in one-to-one correspondence with the t second-type signal nodes 102. Each of the second-type signal nodes 102 included in each circuit module 100 is connected to at least one second-type signal receiving terminal 112, and the number of the second-type signal nodes 102 included in each circuit module 100 is different. When each circuit module 100 includes k second-type signal receiving terminals 112, k and t are integers, and k≥t. The specific description of the second-type signal node 102 described above may refer to the related description of the first-type signal node 101.

It can be understood that, as shown in FIG. 1, when each circuit module 100 included in the circuit board further includes a plurality of second-type signal receiving terminals 112, the touch panel 300 further includes a plurality of second-type signal terminals 320. The plurality of second-type signal terminals 320 are connected in one-to-one correspondence with the plurality of second-type signal receiving terminals 112.

It should be noted that, as shown in FIG. 1, when the circuit board is applied to a capacitive touch panel, if the first-type signal is a sensing signal and the second-type signal is a touch signal, then each of the first-type signal receiving terminals 111 is a sensing signal receiving terminal, and each of the second-type signal receiving terminals 112 is a touch signal receiving terminal. If the first-type signal is a touch signal and the second-type signal is a sensing signal, then each of the first-type signal receiving terminals 111 is a touch signal receiving terminal, and each of the second-type signal receiving terminals 112 is a sensing signal receiving terminal.

Figure 5:
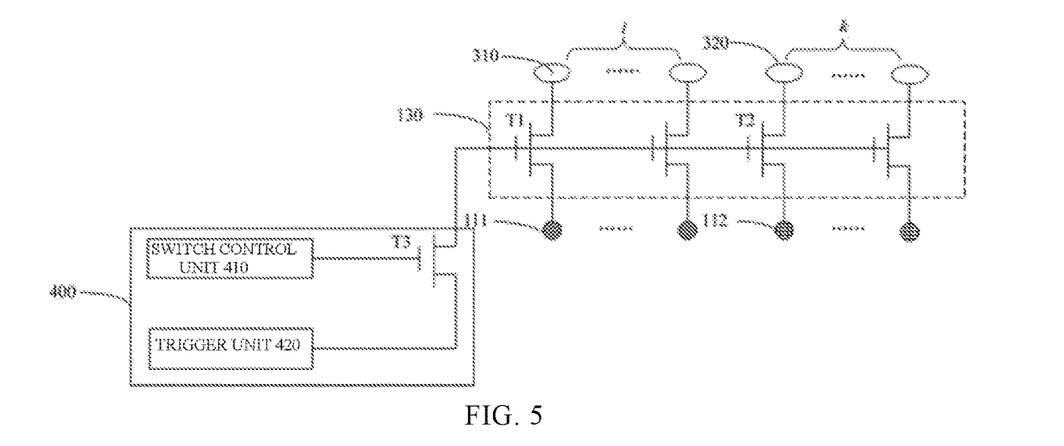
FIG. 5 is a schematic diagram of a connection between a channel switch module and a channel control module according to an arrangement of the present disclosure.

In order to adjust the touch precision of the resulted touch screen after the touch panel and the circuit board are assembled, as shown in FIG. 1 and FIG. 5, the circuit board further includes at least two channel switch module 130 corresponding to the at least two circuit modules 100 one to one. The channel switch module 130 is configured to turn on and off the corresponding circuit module 100. In this case, when the touch panel 300 is assembled with the circuit board, the plurality of first-type signal receiving terminals 111 included in the circuit board and the plurality of first signal terminals 310 included in the touch panel 300 are connected in a one-to-one correspondence through the corresponding channel switch module 130, and the plurality of second-type signal receiving terminals 1 included in the circuit board and the plurality of second signal terminals 320 included in the touch panel are connected in a one-to-one correspondence through the corresponding channel switch module 130.

When the touch panel 300 is assembled with the circuit board, the target circuit module can be selected according to the requirements of the actual touch resolution, and then the channel switch module 130 corresponding to the target circuit module is turned on, and the other circuit modules are turned off, such that the touch precision can be adjusted.

Specifically, as shown in FIG. 1 and FIG. 5, the channel switch module 130 may be an electronic switch. Alternatively, the channel switch module 130 may include a plurality of transistors, and each channel switch module 130 includes a plurality of first transistors T1 and a plurality of second transistors T2.

Input terminals of the plurality of first transistors T1 included in each channel switch module 130 are configured to be connected to the plurality of first-type signal terminals 310 included in the touch panel in a one-to-one correspondence. Output terminals of the plurality of first transistors T1 included in each channel switch module 130 are connected to the plurality of first-type signal receiving terminals 111 included in each channel switch module 130 in a one-to-one correspondence. Input terminals of the plurality of second transistors T2 included in each channel switch module 130 are connected to the plurality of second-type signal terminals 320 included in the touch panel in a one-to-one correspondence. Output terminals of the plurality of second transistors T2 included in each channel switch module 130 are configured to be connected to the plurality of second-type signal receiving terminals 112 included in each channel switch module 130 in a one-to-one correspondence.

To turn on one of the channel switch modules 130, it is only necessary to ensure that the plurality of first transistors T1 and the plurality of second transistors T2 included in the channel switch module 130 are in a conducted state.

An arrangement of the present disclosure further provides a display control device. As shown in FIG. 1, the display control device includes a data processor and the circuit board described above, and the data processor is connected to at least two circuit modules 100.

The display control device provided by the arrangement of the present disclosure includes the above circuit board, the circuit board includes a plurality of circuit modules 100. Although the number of first-type signal receiving terminals 111 included in each circuit module 100 are the same, the number of channels for transferring the first-type signals is different, such that when assembling a display device with a touch function, it has to select suitable circuit module 100 from the circuit board to be connected to the touch panel 300 according to the requirements of the touch resolution, a display device with desired touch-sensitive resolution can be obtained. Therefore, when a display control device according to the arrangement of the present disclosure is assembled with a touch panel, a display device with various touch resolution can be assembled according to practical needs. In this way, it can reduce production cost of the touch screens.

In some arrangements, as shown in FIG. 1, the data processor includes at least two touch drivers 200 corresponding to at least two circuit modules 100 one to one. The number of channels of each touch driver 200 is different, such that when selecting a touch driver 200, by combining touch drivers 200 with large and small numbers of channels, the ratio of touch drivers 200 with large numbers of channels can be reduced, which can further reduce the cost of the touch drivers 200.

For example, as shown in FIG. 1, when each circuit module 100 includes s first-type signal transmitting terminals 121 and t second-type signal transmitting terminals 122, each touch driver includes s first-type signal interfaces 201 and t second-type signal interfaces 202, the s first-type signal transmitting terminals 121 included in each circuit module 100 are connected to the s first-type signal interfaces 201 included in each data driver in a one-to-one correspondence, and the t second-type signal transmitting terminals 122 included in each circuit module 100 are connected to the t second-type signal interfaces 202 included in each touch driver in a one-to-one correspondence.

Figure 2:
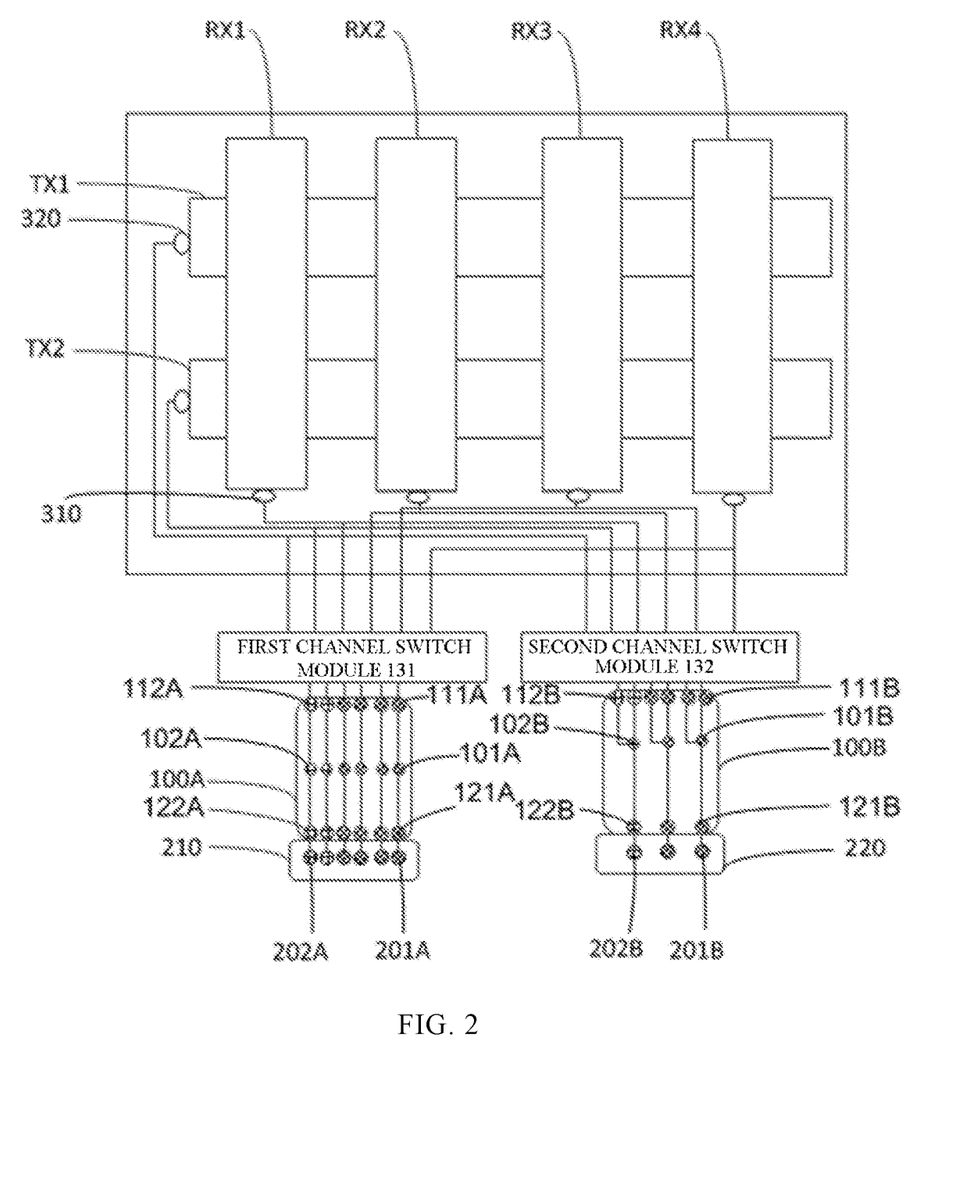
FIG. 2 is a schematic structural diagram of a display control device according to an arrangement of the present disclosure.

FIG. 2 shows a schematic diagram of the connection between a circuit board and a touch panel. In FIG. 2, the touch panel includes 6 signal channels and 6 signal terminals. The 6 signal terminals include 4 first-type signal terminals 310 and 2 second signal terminals 320, and the 6 signal channels includes 4 receiving channels and 2 transmitting channels.

The 4 receiving channels include a first receiving channel RX1, a second receiving channel RX2, a third receiving channel RX3, and a fourth receiving channel RX4. The 2 transmitting channels include a first transmitting channel TX1 and a second transmitting channel TX2.

The circuit board includes a first circuit module 100A, a second circuit module 100B, a first channel switch module 131 corresponding to the first circuit module 100A, and a second channel switch module 132 corresponding to the second circuit module 100B. The data processor includes a first touch driver 210 and a second touch driver 220.

Figure 3:
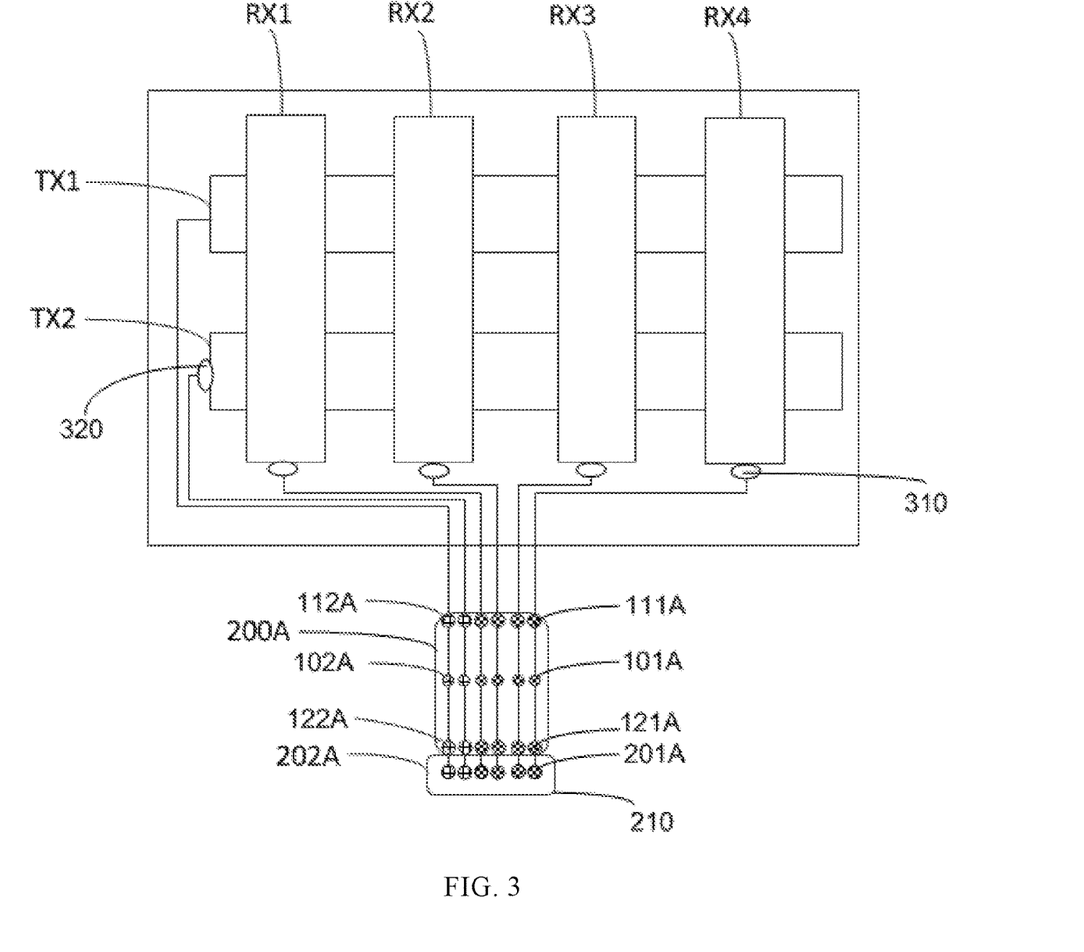
FIG. 3 is a first connection state diagram of a display control device according to an arrangement of the present disclosure.

As shown in FIG. 2 and FIG. 3, the first circuit module 100A includes 4 first-type signal receiving terminals 111, 2 second-type signal receiving terminals 112, 4 first-type signal nodes 101, 2 second-type signal nodes 102, 4 first-type signal transmitting terminals 121 and 2 second-type signal transmitting terminals 122. Correspondingly, the first touch driver 210 includes 4 first-type signal interfaces 201 and 2 second-type signal interfaces 202. The 4 first-type signal receiving terminals 111A of the first circuit module are connected to the 4 first-type signal nodes 101A of the first circuit module in a one-to-one correspondence. The 4 first-type signal nodes 101A of the first circuit module are connected to the 4 first-type signal transmitting terminals 121A of the first circuit module in a one-to-one correspondence. The 4 first-type signal transmitting terminals 121A of the first circuit module are connected to the 4 first-type signal interfaces 201A of the first touch driver in a one-to-one correspondence. The 2 second-type signal receiving terminals 112A of the first circuit module are connected to the 2 second-type signal nodes 102A of the first circuit module in a one-to-one correspondence. The 2 second-type signal nodes 102A of the first circuit module are connected to the 2 second-type signal transmitting terminals 122A in a one-to-one correspondence. The 2 second-type signal transmitting terminals 122A of the first circuit module are connected to the 2 second-type signal interfaces 202A of the first touch driver in a one-to-one correspondence.

Figure 4:
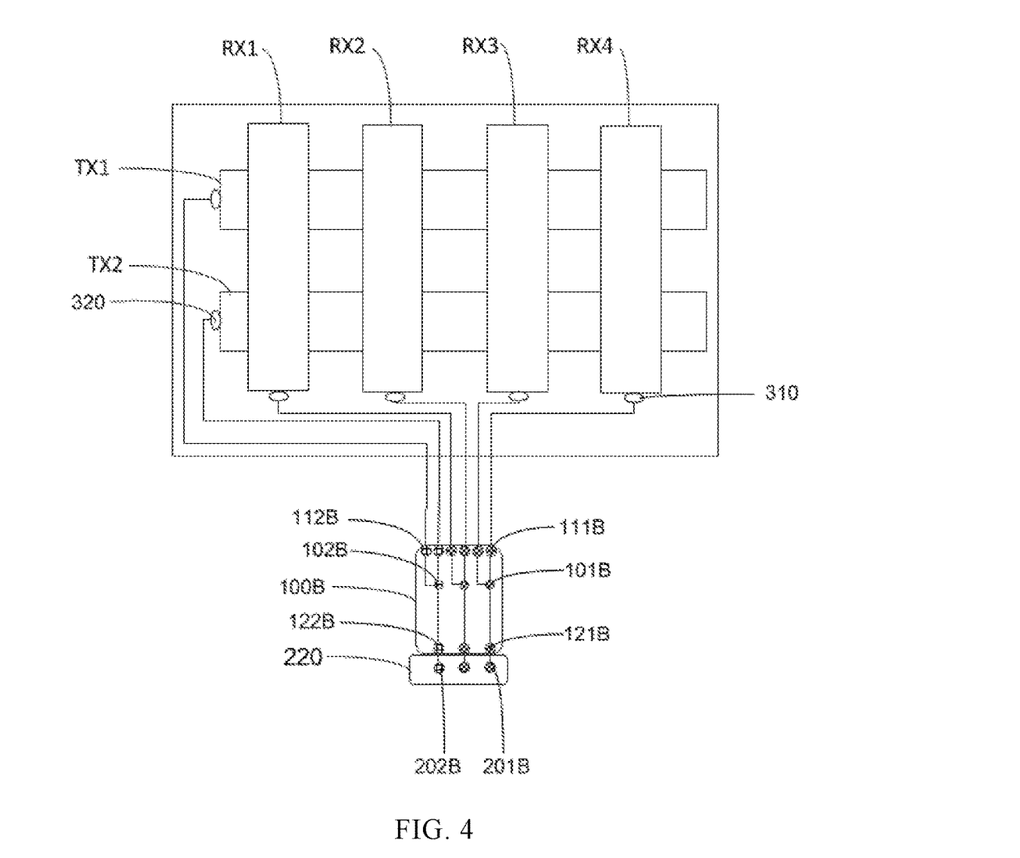
FIG. 4 is a second connection state diagram of a display control device according to an arrangement of the present disclosure.

As shown in FIG. 2 and FIG. 4, the second circuit module 100B includes 4 first-type signal receiving terminals 111, 2 second-type signal receiving terminals 112, 2 first-type signal nodes 101, 1 second-type signal nodes 102, 2 first-type signal transmitting terminals 121 and 1 second-type signal transmitting terminal 122. Correspondingly, the second touch driver 220 includes 2 first-type signal interfaces 201 and 1 second-type signal interface 202. Of the 4 first-type signal receiving terminals 111B of the second circuit module, every 2 first-type signal receiving terminals are connected correspondingly to 1 first-type signal node 101 of the 2 first-type signal nodes 101B of the second circuit module. The 2 first-type signal nodes 101B of the second circuit module are connected to the 2 first-type signal transmitting terminals 121B of the second circuit module in a one-to-one correspondence. The 2 first-type signal transmitting terminals 121B of the second circuit module are connected to the 2 first-type signal interfaces 201B of the second touch driver in a one-to-one correspondence. The 2 second-type signal receiving terminals 112B of the second circuit module are connected to the 1 second-type signal node 102B of the second circuit module. The 1 second-type signal node 102B of the second circuit module is connected to the 1 second-type signal transmitting terminals 122B of the second circuit module. The 1 second-type signal transmitting terminals 122B of the second circuit module is connected to the 1 second-type signal interface 202B of the second touch driver.

As can be seen from the above, when the first channel switch module 131 is turned on and the second channel switch module 132 is turned off, the first circuit module 100A has 4 channels for transferring the first-type signals, and 2 channels for transferring the second-type signals. At this time, the first-type signals and the second-type signals of the touch panel are transferred with the first circuit module 100A, to obtain a display device of a relatively high touch resolution.

When the first channel switch module 131 is turned off and the second channel switch module 132 is turned on, the second circuit module 100B has 2 channels for transferring the first-type signals, and 1 channel for transferring the second-type signals. At this time, the first-type signals transferred by the touch panel may be merged through the second circuit module 100B by combining every two channels into one channel. Similarly, the first-type signals transferred by the touch panel may be merged by combining every two channels into one channel, so that when the circuit board transfers signals through the second circuit module 100B, the signals of 6 channels transferred by the touch panel 300 are merged to signals of 4 channels, to obtain a display device of a relatively low touch resolution.

The channel combining manner of the second circuit module 100B for transmitting the second-type signals shown in FIG. 4 above is only a specific implementation, but is not limited thereto.

For example, in the case where every two channels for transferring the first-type signals are merged into one, every three channels for transferring the second-type signals are merged together. That is, each of the first-type signal nodes 101 is connected to two first-type signal receiving terminals 111, and each of the second-type signal nodes 102 is connected to three second-type signal receiving terminals 112.

For another example, in a case where channels for transferring the first-type signals are not merged, the channels for transferring the second-type signals are merged, and at least two channels for transferring the second-type signals are merged together. That is, each of the first-type signal nodes 101 is connected in one-to-one correspondence with 1 first-type signal receiving terminal 111, and each second-type signal node 102 is connected in one-to-one correspondence with at least two second-type signal receiving terminals 112.

In some arrangements, as shown in FIG. 5, when the circuit board further includes at least two channel switch modules 130, the display control device can further include a channel control module 400. The channel control module 400 is connected to control terminals of the at least two channel switch modules 130, to control the turning on and off of each channel switch module 130 through the channel control module 400.

In an implementation, the channel control module 400 can establish a point-to-point link with each channel switch module 130 through a point-to-point protocol, such that the channel control module 400 can send a point-to-point control signal to the corresponding channel switch module 130 to control the turning on and off of the corresponding channel switch module 130 with the point-to-point control signal.

In another implementation, as shown in FIG. 5, the channel control module 400 includes a switch control unit 410, a trigger unit 420, and at least two third transistors T3. The at least two third transistors T3 and at least two circuit modules 100 correspond one-to-one. The switch control unit 410 is connected to the control terminal of each of the third transistors T3, and the trigger unit 420 is connected to the input terminal of each of the third transistors T3, and the output terminal of each of the third transistors T3 is connected to the control terminal of each channel switch module 130 in a one-to-one correspondence.

When each channel switch module 130 includes a plurality of first transistors T1 and a plurality of second transistors T2, the output terminal of each of the third transistors T3 included in the channel control module is connected to the control terminals of the plurality of first transistors T1 and the control terminals of the plurality of second transistors T2 included in the corresponding channel switch module 130.

The switch control unit 410 can control each of the third transistors T3 to be turned on and off. When the third transistor T3 is turned on, the trigger unit 420 generates a trigger signal and sends the trigger signal through the turned-on third transistor T3 to the channel switch unit 130, and the trigger signal can control the channel switch unit 130 to be turned on and off.

For example, when the circuit board is assembled with the touch panel, one of the circuit modules 100 (hereinafter referred to as the current circuit module) included in the circuit board and the touch panel 300 are connected through a corresponding channel switch unit 130 (hereinafter referred to as current channel switch unit). At this time, the current third transistor corresponding to the current channel switch unit is in a turned-on state. When the touch resolution conversion is required, the trigger unit 420 provides a trigger signal to the current channel switch unit through the current transistor to turn off the current channel switch unit, such that the signal of the display panel cannot be transmitted to the current circuit module. Then, the switch control unit 410 controls the current third transistor to be turned off. After that, according to determined target channel switch module of the required channel of the circuit board, the switch control unit 410 controls the target third transistor corresponding to the target channel switch module to be turned on. Then, the trigger unit transmits the trigger signal to the target channel switch module through the target third transistor, to turn on the target channel switch module. In this way, the signal of the touch panel can be provided to the circuit module 100 corresponding to the target channel switch module, thus realizing the change of the touch precision.

As shown in FIG. 1 to FIG. 4, an arrangement of the present disclosure further provides a display device including a touch panel 300 and the display control device described above. The touch panel 300 includes a plurality of first-type signal terminals 310, and each of the plurality of first-type signal receiving terminals 111 included in each circuit module 100 is configured to be connected to the plurality of first-type signal terminals 310 in a one-to-one correspondence.

In the display device provided by the arrangement of the present disclosure, the touch panel 310 includes a plurality of first-type signal terminals 310, and each of the plurality of first-type signal receiving terminals 111 included in each circuit module 100 is connected to the plurality of first-type signal terminals 310 in a one-to-one correspondence, such that each circuit module 100 can be connected to the touch panel 300. Since the number of channels used by each circuit module 100 for transmitting the first-type signal is different, when the touch screen 300 is assembled with the touch panel and the circuit board, it is only necessary to, according to the requirements of the touch resolution, select a suitable circuit module from the circuit board to be connected to the touch panel 300, to obtain a touch screen 300 that meets the touch resolution requirements. Therefore, when the circuit board provided by the arrangement of the present disclosure is assembled with a touch panel, the touch panel can have different touch resolutions according to actual needs. In this way, it can reduce the production cost of the touch screen.

The display device provided in the foregoing arrangement may be any product or component having a display function, such as a mobile phone, a tablet computer, a television, a display, a notebook computer, a digital photo frame, or a navigator.

As shown in FIG. 1 to FIG. 4, when each of the circuit modules 100 includes a plurality of first-type signal receiving terminals 111, the touch panel 300 further includes a plurality of second-type signal terminals 320, each of the plurality of second-type signal receiving terminals 112 included in each circuit module 100 is configured to be connected to the plurality of second-type signal terminals.

In some arrangements, as shown in FIG. 1 to FIG. 5, if the circuit board includes at least two channel switch modules 130 corresponding to at least two circuit modules 100 one to one, the plurality of first-type signal receiving terminals 111 included in each circuit module 100 can be connected to the plurality of first-type signal terminals 310 through a corresponding channel switch module 130, and the plurality of second-type signal receiving terminals 112 included in each circuit module 100 can be connected to the plurality of second-type signal terminals 320 through a corresponding channel switch module 130.

In the description of the above arrangements, specific features, structures, materials or characteristics may be combined in any suitable manner in any one or more arrangements or examples.

The above is only specific arrangements of the present disclosure, but the scope of the present disclosure is not limited thereto, and any person skilled in the art can easily think of changes or substitutions within the technical scope of the present disclosure, which should be covered by the scope of the present disclosure. Therefore, the scope of the present disclosure should be determined by the scope of the appended claims.

What is claimed is:

1. A circuit board connected to a touch panel and configured to receive at least a first-type signal, comprising:
at least two circuit modules, wherein each of the at least two circuit modules comprises a plurality of first-type signal receiving terminals, and respective numbers of the first-type signal receiving terminals comprised in the at least one two circuit modules are the same,
wherein each of the at least two circuit modules further comprises s first-type signal nodes, and each of the at least two circuit modules is configured to merge, through the s first-type signal nodes, channels used for transmitting the first-type signal so that respective numbers of channels used by the two circuit modules to transmit the first-type signal are different, and
wherein one of the at least two circuit modules is connected to the touch panel according to a touch resolution requirement of the touch panel.

2. The circuit board according to claim 1, wherein:
each of the at least two circuit modules further comprises s first-type signal transmitting terminals connected in a one-to-one correspondence with the s first-type signal nodes;
each of the first-type signal nodes comprised in each of the two circuit modules is connected to at least one of the first-type signal receiving terminals; and
respective numbers of the first-type signal nodes comprised in the two circuit modules are different.

3. The circuit board according to claim 2, wherein respective numbers of the first-type signal receiving terminals connected to at least two of the first-type signal nodes in the at least two circuit modules are either the same or different.

4. The circuit board according to claim 1, wherein:
each of the at least two circuit modules further comprises a plurality of second-type signal receiving terminals;
respective numbers of the second-type signal receiving terminals comprised in the two circuit modules are the same; and
respective numbers of channels used by the two circuit modules to transmit a second-type signal are different.

5. The circuit board according to claim 4, wherein:
each of the at least two circuit modules further comprises t second-type signal nodes and t second-type signal transmitting terminals connected in a one-to-one correspondence with the t second-type signal nodes;
each of the second-type signal nodes comprised in each of the two circuit modules is connected to at least one second-type signal receiving terminal; and
respective numbers of the second-type signal nodes comprised in the two circuit modules are different.

6. The circuit board according to claim 5, wherein respective numbers of the second-type signal receiving terminals connected to at least two of the second-type signal nodes in the at least two circuit modules are either the same or different.

7. The circuit board according to claim 4, wherein each of the first-type signal receiving terminals is a touch signal receiving terminal, and each of the second-type signal receiving terminals is a sensing signal receiving terminal.

8. The circuit board of claim 1, wherein the circuit board further comprises at least two channel switch modules in a one-to-one correspondence with the at least two circuit modules, and each of the at least two channel switch modules is configured to turn on and off the corresponding circuit module.

9. A display control device comprising a data processor and the circuit board according to claim 1, wherein the data processor is connected to the at least two circuit modules.

10. The display control device according to claim 9, wherein the data processor comprises at least two touch drivers in a one-to-one correspondence with the at least two circuit modules, and respective numbers of channels of the at least two touch drivers are different.

11. The display control device according to claim 10, wherein, when each of the two circuit modules comprises s first-type signal transmitting terminals and t second-type signal transmitting terminals, each touch driver comprises s first-type signal interfaces and t second-type signal interfaces, the s first-type signal transmitting terminals comprised in each of the circuit modules are connected to the s first-type signal interfaces comprised in each of the touch drivers in a one-to-one correspondence, and the t second-type signal transmitting terminals comprised in each of the circuit modules are connected to the t second-type signal interfaces comprised in each of the touch drivers in a one-to-one correspondence.

12. The display control device according to claim 9, wherein, when the circuit board further comprises at least two channel switch modules, the display control device further comprises a channel control module, and the channel control module is connected to control terminals of the at least two channel switch modules.

13. A display device, comprising: the touch panel and the display control device according to claim 9, wherein the touch panel comprises a plurality of first-type signal terminals, and each of the plurality of first-type signal receiving terminals comprised in each of the at least two circuit modules is configured to connect to the plurality of first-type signal terminals in a one-to-one correspondence.

14. The display device according to claim 13, wherein, when each of the circuit modules comprises a plurality of second-type signal receiving terminals, the touch panel further comprises a plurality of second-type signal terminals, each of the plurality of second-type signal receiving terminals comprised in each of the circuit modules is configured to be connected to the plurality of second-type signal terminals in a one-to-one correspondence.

15. A touch panel, comprising:
at least one first-type signal receiving terminal, the at least one first-type signal receiving terminal connected to a first-type sensor channel for transmitting a first-type signal;
at least one second-type signal receiving terminal, the at least one second-type signal receiving terminals connected to a second-type sensor channel for transmitting a second-type signal;
at least one first-type of signal transmitting terminal; and
at least one second-type signal transmitting terminal wherein the touch panel is connected to the circuit board according to claim 1.

16. A method for connecting a touch panel, comprising: providing the touch panel, wherein the touch panel comprises:
    at least one first-type signal receiving terminal, the at least one first-type signal receiving terminal connected to a first-type sensor channel for transmitting a first-type signal;
    at least one second-type signal receiving terminal, the at least one second-type signal receiving terminal connected to a second-type sensor channel for transmitting a second-type signal;
    at least one first-type of signal transmitting terminal; and
    at least one second-type signal transmitting terminal:
connecting the at least one first-type signal transmitting terminal to the at least one first-type signal receiving terminal through a first-type signal node according to a touch resolution requirement of the touch panel; and
connecting the at least one second-type signal transmitting terminal to the at least one second-type signal receiving terminal through a second-type signal node according to a touch resolution requirement of the touch panel;
wherein the first-type signal node is configured to merge channels used for transmitting the first-type signal, and the second-type signal node is configured to merge channels used for receiving the second-type signal.

17. The method of claim 16, wherein the at least one first-type signal transmitting terminal is connected to the at least one first-type signal receiving terminal through the first-type signal node, and the at least one second-type signal transmitting terminal is connected to the at least one second-type signal receiving terminal through the second-type signal node.

18. The method of claim 16, wherein the at least one first-type signal transmitting terminal is connected to the at least one first-type signal receiving terminal through the first-type signal node, and the at least one second-type signal transmitting terminal is connected to more than one second-type signal receiving terminals through the second-type signal node.

19. The method of claim 16, wherein the at least one first-type signal transmitting terminal is connected to more than one first-type signal receiving terminals through the first-type signal node, and the at least one second-type signal transmitting terminal is connected to one second-type signal receiving terminal through the second-type signal node.

20. The method of claim 16, wherein the at least one first-type signal transmitting terminal is connected to more than one first-type signal receiving terminals through the first-type signal node, and the at least one second-type signal transmitting terminal is connected to more than one second-type signal receiving terminals through the second-type signal node.

\* \* \* \* \*